Figure 1:
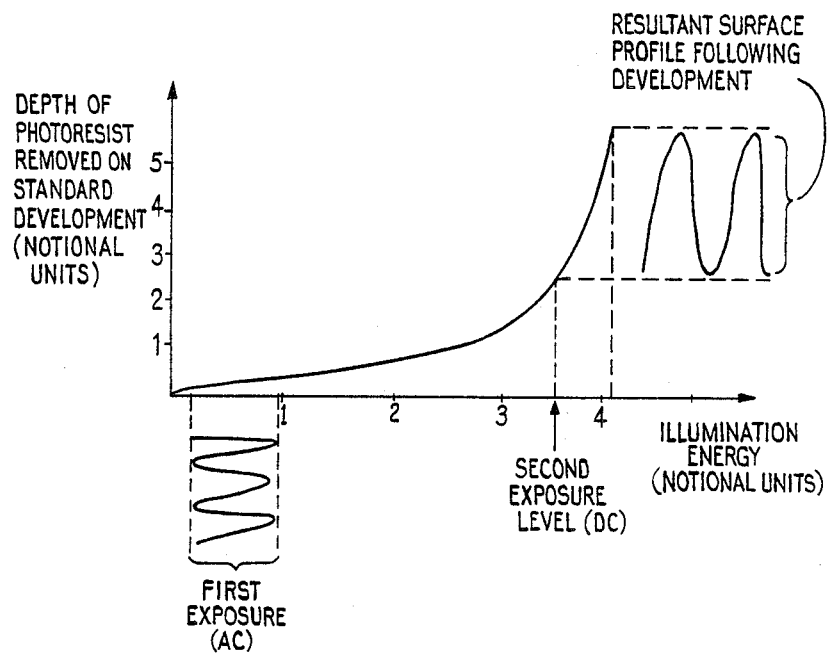

United States Patent [19]

Longman et al.

[11] Patent Number: 4,866,696
[45] Date of Patent: Sep. 12, 1989

[54] PRE-FORMATTED MOTH-EYE TYPE OPTICAL DATA STORAGE MEMBER AND METHOD

[75] Inventors: Robert J. Longman, Coton; Peter R. Helfet, London; Philip A. Storey, Thriplow, all of England

[73] Assignee: Plasmon Data Systems, Inc., San Jose, Calif.

[21] Appl. No.: 160,819

[22] Filed: Feb. 26, 1988

[30] Foreign Application Priority Data

Feb. 26, 1987 [GB] United Kingdom ............... 8704512

[51] Int. Cl.⁴ ............................................. G11B 7/00
[52] U.S. Cl. .................................. 369/275; 350/1.6; 365/127
[58] Field of Search .................. 350/1.6; 369/32, 33, 369/43, 44, 50-54, 58, 109, 111, 275; 365/127

[56] References Cited

U.S. PATENT DOCUMENTS 4,322,125  3/1982  Warren ............................. 350/1.6
4,402,061  8/1983  Hazel et al. ....................... 365/127

Primary Examiner—Robert L. Richardson
Attorney, Agent, or Firm—Poms, Smith, Lande & Rose

[57] ABSTRACT

A pre-formatted optical data storage member is described in which format zones are generated by the provision in the surface of the optical medium of a "moth-eye" structure, i.e. regular surface pattern in the form of an arrangement of grooves or protuberances. The pitch and depth of the pattern is such that when irradiated with illumination of predetermined optical characteristics, the format zones display a reflectivity substantially lower than that of the remainder of the optical storage member. Methods of producing optical data storage members with such pre-formatting are also described.

11 Claims, 1 Drawing Sheet

PRE-FORMATTED MOTH-EYE TYPE OPTICAL DATA STORAGE MEMBER AND METHOD

This invention relates to the formatting of optical data storage members by a technique involving the use of a structured surface.

Optical data storage members are most usually in the form of disks or cards. The present invention is not limited in its application to optical data storage members in the form of disks and cards; nevertheless it will be convenient hereinafter to refer to these storage members, and it is to be understood that the invention extends to other data storage members.

There is a need to provide a relatively easy way of formatting optical data storage members (hereinafter referred to as "ODSMs"), e.g. cards and disks. Traditionally, formatting has been achieved by generating a phase contrast, along, say, a line across the ODSM which in turn requires a step of lambda/n (where lambda equals the wave-length of the read radiation and n is a whole number) in the surface of the medium. This phase-contrasted line is conventionally produced as a series of pits aligned generally axially. The spot of light used to read data from the disc must overlap the boundaries of this pits in the surface of the medium, and the phase difference between reflections from the pitted region and those at either side thereof results in destructive interference and hence very low reflectivity.

A particular problem which is associated with disks as opposed to other data storage media concerns the need to maintain time synchronization while tracking the disk. This means that instead of a narrow phase contrast line as discussed above, formatting involves the generation of a sector which is required to display the necessary low reflectivity. In many media, the production of relatively large areas of low reflectivity is very time consuming and, accordingly, represents a major component in the manufacturing cost for the production of optical disks. This is particularly the case with ODSMs in which the "active" material involved in the optical data storage process is the semi-metal tellurium.

U.S. Pat. No. 4,616,237 issued Oct. 7, 1986 discloses a data storage medium or a surface region which is strongly absorbant of at least a predetermined band of wave-lengths of electromagnetic radiation so that the surface or a region the surface can be written upon. The surface includes a layer of heat sensitive material which has a textured surface pattern which is a regular pattern comprising an arrangement of grooves or protuberances. The pitch of the pattern is smaller than the shortest wave-length within the predetermined band, and the depth (peak-to-trough) of the pattern is at least 100 nm. The pattern is free from undercutting so as to be suitable for production or replication by moulding, casting or embossing against a tool. Also, the textured surface pattern is overcoated with a thin film of a high opacity material, e.g. a metal. The basic surface topology involved in the optical data storage members described and claimed in this U.S. patent has been termed "moth-eye" because it bears a resemblance to the corneal nipple array characteristic of nocturnal insects, in particular of a number of species of the order Lepidoptera. This structure as it occurs naturally was first described by Bernhard, C. G. and Miller, W. H. in 1962 in an article entitled "A Corneal Nipple Pattern in Insect Compound Eyes", Acta Physiologica Scandinavica, volume 56, pages 385–386.

We have now found that the use of "moth-eye" type surface structure can effectively provide format lines and format sectors in optical data storage media. Accordingly, in one aspesct, the present invention provides a pre-formatted optical data storage member, in which format zones (e.g. lines and/or sectors) are generated by the provision in the surface of the optical medium of a regular surface pattern in the form of an arrangement of grooves or protuberances the pitch and depth of the pattern being such that when irradiated with illumination of predetermined optical characteristics (i.e. that used in reading data from the optical data storage member), said format zones display a reflectivity substantially lower than that of the remainder of the optical storage member.

Those parts of the ODSM other than the format zones (e.g. lines or sectors) may or may not themselves carry a "moth-eye" type surface texture. Thus in one embodiment, the remainder of the ODSM comprises a generally planar surface of an optically sensitive material, e.g. tellurium. In another embodiment, the remainder of the ODSM comprises "moth-eye" structure of relatively shallow depth compared with that which constitutes the format lines and/or format sectors.

Since format zones have much reduced reflectivity, they will be termed "black areas" hereinafter.

The present invention also provides a number of techniques for generating black areas on an ODSM. In one method, the optical storage medium is coated with a non-linear photoresist and is then subjected to two exposure steps. In the first step, relatively low power alternating intensity illumination is employed, the intensity at its maximum being beneath the steep part of the characteristic plot of material removed against energy of incident illumination. The second exposure uses a steady, higher powered constant (DC) illumination directed *only* onto those regions of the disk where black areas are to be generated. Thereafter, the entire card or disk is developed, resulting in the provision of moth-eye structure only in the areas designated as black areas. FIG. 1 of the accompanying drawings illustrates a typical characteristic for a non-linear resist and diagramatically depicts the two exposure steps involved in the method just described.

In a second method, the optically sensitive medium of the ODSM is coated with a mask, e.g. a chrome mask, over all of those areas except those which are designated as black areas. A photoresist is then deposited over the chrome mask and exposed in the normal way (e.g. to a laser interference pattern) in order to generate the desired moth-eye structure. In this method, the photoresist may be linear or non-linear. The exposure is from behind the substrate, which will generally be of glass.

In a third method, a mask (e.g. a chrome mask) is deposited over the glass substrate *only* in areas designated as black areas. The mask and exposed areas of glass substrate are then coated with a photoresist, which is subjected to an interferometer exposure from the resist side. Next, the opposite side of the ODSM is flooded with steady illumination to wash out clear areas of the mask. The photoresist is then developed, which gives rise to moth-eye structure only in the regions where the mask was deposited.

In a fourth technique, a master ODSM, e.g. a disk, carrying moth-eye structure over its entire surface is coated with a photoresist which is then masked, the areas of mask corresponding to those which are not designated as black areas in the final product. The structure thus formed as illuminated from the resist side through the mask, and areas of resist located between the mask are removed, on development, to reveal the underlying moth-eye structure from the original master.

Figure 2:
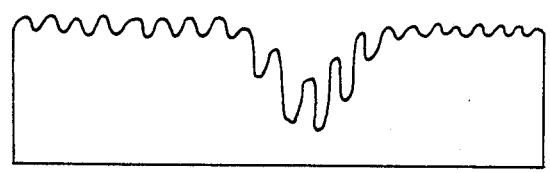

FIG. 2 of the accompanying drawings illustrates that embodiment of the present invention in which there is moth-eye structure over the entire surface of the ODSM, the moth-eye structure in the black areas being deep and that in the remainder of the ODSM being shallow.

The techniques described above may be used with tellurium-coated substrates, with dye-polymer materials or with other conventional substrates for optical data storage members.

We claim:

1. A pre-formatted optical data storage member, in which format zones are generated by the provision in the surface of the optical medium of a regular surface pattern in the form of an arrangement of grooves or protuberances the pitch and/or depth of the pattern being different from the remainder of the optical storage members such that when irradiated with illumination of predetermined optical characteristics, said format zones include means for displaying a reflectivity substantially lower than that of the remainder of the optical storage member.

2. An optical data storage member as claimed in claim 1, wherein said format zones are lines or sectors.

3. An optical data storage member as claimed in claim 1, wherein those areas of the optical data storage member which are not format zones carry a regular surface pattern in the form of an arrangement of grooves or protuberances, the depth of the pattern in said format zones being greater than that in said non-format areas.

4. A method of pre-formatting an optical data storage member, which comprises coating the substrate of an optical storage medium with a non-linear photoresist; subjecting said photoresist to a first exposure step in which relatively low power alternating intensity illumination is employed, the intensity at its maximum being beneath the steep part of the characteristic plot of material removed against energy of incident illumination; and thereafter subjecting said photoresist to a second exposure step in which a steady, higher powered constant (DC) illumination directed only onto those regions of the optical data storage member which are to become format zones; and thereafter, developing the photoresist, thereby generating the desired structure in the format zones and leaving the remainder of the optical data storage member substantially planar.

5. A method of pre-formatting an optical data storage member, which comprises coating all of the area of an optical data storage member other than predetermined regions which are to become format zones with a mask; depositing a photoresist over the whole of the optical data storage member; exposing the photoresist from behind said mask to a pattern corresponding to that desired to be generated in the format zones; and developing the photoresist so that non-exposed areas of photoresist are removed.

6. A method of pre-formatting an optical data storage member, which comprises coating only the predetermined regions of the optical data storage member which are to become format zones with a mask; depositing a photoresist over the whole of the optical data storage member; exposing the photoresist from in front of said mask to a pattern corresponding to that desired to be generated in the format zones; and developing the photoresist so that non-exposed areas of photoresist are removed.

7. A preformatted optical data storage medium comprising:
   an optical storage member having a main surface area having a series of regular grooves and regular ridged protuberances having a substantial reflectivity; and
   means for providing format zones having a substantially lower reflectivity than that of said main surface area, said means including a regular surface pattern in the form of an arrangement of regular grooves and regular ridged protuberances with a depth of said pattern being significantly different from the average level of said main surface area.

8. An optical data storage member as claimed in claim 7, wherein said format zones are lines or sectors.

9. An optical data storage member as claimed in claim 7 wherein those areas of the optical data storage member which are not format zones carry a regular surface pattern in the form of an arrangement of grooves or protuberances, the depth of the pattern in said format zones being greater than that in said non-format areas.

10. An optical data storage member as claimed in claim 8 wherein those areas of the optical data storage member which are not format zones carry a regular surface pattern in the form of an arrangement of grooves or protuberances, the depth of the pattern in said format zones being greater than that in said non-format areas.

11. An optical data storage member as claimed in claim 2, wherein those areas of the optical data storage member which are not format zones carry a regular surface pattern in the form of an arrangement of grooves or protuberances, the depth of the pattern in said format zones being greater than that in said non-format areas.

* * * * *